United States Patent [19]

Runyan et al.

[11] Patent Number: 5,573,195
[45] Date of Patent: Nov. 12, 1996

[54] DATA CARTRIDGE WITH PIVOTING ROLLER YOKE

[75] Inventors: John F. Runyan; Jerry L. Alexander, both of St. Paul, Minn.

[73] Assignee: Minnesota Mining & Manufacturing Company, St. Paul, Minn.

[21] Appl. No.: 394,372

[22] Filed: Feb. 24, 1995

[51] Int. Cl.$^6$ ............................................. G11B 23/087
[52] U.S. Cl. ............................ 242/340; 242/352.4
[58] Field of Search ............................ 242/340, 342, 242/352.3, 352.4; 360/132

[56] References Cited

U.S. PATENT DOCUMENTS

| | | | |
|---|---|---|---|
| 3,692,255 | 9/1972 | Von Behren . | |
| 4,146,194 | 3/1979 | Majicek . | |
| 4,209,144 | 6/1980 | Majicek | 242/352.4 |
| 4,431,146 | 2/1984 | Merle | 242/352.4 |
| 4,541,024 | 9/1985 | Sieben | 242/358 |
| 4,571,655 | 2/1986 | Merle | 360/132 |
| 4,832,283 | 5/1989 | Treff et al. . | |
| 5,203,519 | 4/1993 | Rotter . | |
| 5,374,004 | 12/1994 | von Behren | 242/352.4 |
| 5,377,927 | 1/1995 | Erickson et al. | 242/346 |

FOREIGN PATENT DOCUMENTS

| | | | |
|---|---|---|---|
| 0466608 | 1/1992 | European Pat. Off. . | |
| 63-122966 | 8/1988 | Japan . | |
| 1554026 | 3/1990 | U.S.S.R. | 360/132 |

Primary Examiner—John P. Darling
Attorney, Agent, or Firm—Gary L. Griswold; Walter N. Kirn; H. Sanders Gwin, Jr.

[57] ABSTRACT

In a belt driven tape cartridge, tape tension is controlled by a yoke which articulates in a region between the tape packs. The yoke includes at least two rollers, one mounted adjacent each tape pack, for rotation on shafts constrained in the yoke. The cartridge belt is stretched around the drive roller and the yoked rollers to pull the yoke mechanism into firm engagement with the tape packs.

25 Claims, 8 Drawing Sheets

DATA CARTRIDGE WITH PIVOTING ROLLER YOKE

BACKGROUND OF THE INVENTION

1. Field of the Invention

The present invention relates to belt-driven computer tape cartridges. In particular, the invention relates to a yoke mechanism with rollers for controlling tape tension variations in the cartridge tape.

2. Description of Related Art

A highly successful elastic belt-driven data cartridge originally was described in U.S. Pat. No. 3,692,255 to von Behren. In that reference, a tape cartridge has tape wrapped convolutely in opposite directions around hubs and guide pins to guide the tape past the tape drive read/write head. An elastic belt wraps pan-way around the tape packs and the hubs, as well as around corner rollers and a drive roller. The belt is moved by the drive through frictional rotation of a drive puck by a motor. Provided adequate tension is maintained in the belt, movement of the belt will simultaneously move the tape. Friction at the corner rollers will differentially stretch the outer surface of the belt, which tensions the tape so that it can interface properly with the read/write heads.

Conventional belt tensioning configurations produce excessive "bow tie," an increase in tape tension which occurs near the end of tape (EOT), or, when the tape moves in the reverse direction, near the beginning of tape (BOT). The bow tie effect becomes apparent upon analysis of tape tension plots. High levels of tension near BOT and EOT stresses and distorts the tape, while increased average tape tension increases tape and read/write head wear, increases drive force, and generally results in less than ideal transfer of tape from one tape pack to the other. Low tape tension may cause increased read errors.

Various roller designs and roller placement configurations have been investigated in an effort to improve tape tension control in belt driven data cartridges with dual tape packs. For example, the tape cartridge described in EP 0466608 uses no corner rollers to stretch the entire belt cross section, but instead uses a single large pack roller to stretch the belt outer surface and control variations in tape tension (such tape cartridges have been manufactured by Societe Anonyme DYPI, a French Corporation, and are well known in the art). As shown in FIGS. 7–8 of the EP '608 patent, after wrapping around a drive roller 5, an elastic belt 8 contacts a first supply tape pack 3, passes between the tape pack 3 and the pack roller 9, wraps around the pack roller, passes between the pack roller and a second take-up tape pack 3', contacts the take-up pack 3', and returns to the drive roller 5. FIGS. 7–8 of the EP '608 patent also show a "watchplate" construction in which a plate 11 positioned parallel to the plane of the baseplate 1 engages the shafts 14,14' of the tape packs to improve shaft stability.

The belt driven cartridge in FIGS. 7–8 of the EP '608 patent develops reasonably good tape tension with little apparent roller drag around the belt path. However, the large pack roller 9 is biased so the belt transfers a large portion of its energy to the take-up pack 3' after the point of initial contact with the tape. An enhanced belt outer surface speed relative to the roller outer surface is difficult to achieve as the belt unwraps from the single large roller 9. The large pack roller 9 in constant contact with both tape packs also prevents rotation of the hubs to remove tape slack if the cartridge is removed from the drive.

FIG. 9 of Japanese Utility Model 63-122966 describes a tension control mechanism with a three roller yoke 50 including two outboard tension control rollers 8a, 8b in contact with the tape packs. A pin 10c of the central roller 8c is not rigidly mounted to the housing 2, but is free to articulate in a slot 51 generally parallel to a line projected through the shafts 5 of the hubs 4. In this design, the wide yoke spreads rollers 8a, 8b apart nearly as far as the hub pins 5, and the rollers cannot be pulled by the belt to press tightly enough against the tape packs to efficiently transfer the belt's excess outer surface speed to the tape. As shown, belt tension would instead force the yoke and the outboard tension control rollers 8a, 8b away from the tape pack. A sudden movement of the yoke pin 10c in the slot 51 would not maintain firm engagement of the belt and tape packs as the packs vary in size. Over the life of the cartridge, buildup of din and debris in slot 51 could prevent smooth operation of the yoke.

As recording densities and tape transport speeds increase, it has become apparent that precise control over tape tension is critical to enhancement of record/playback performance. The tape tension variations, particularly near the beginning and end of tape, produced in conventional data cartridge designs are inadequate to meet projected future recording needs.

SUMMARY OF THE INVENTION

In the data cartridge of the present invention, some of the belt surface stretch provided by drag at the corner rollers in conventional cartridges is instead produced by winding the belt around an overcenter yoke mechanism. The yoke mechanism includes a yoke with at least two rollers, generally referred to herein as tension control rollers, which are each mounted for rotation on a shaft constrained in the yoke. The yoke is positioned such that one tension control roller resides adjacent each tape pack, and the yoke length allows the yoke mechanism to articulate in a region between the tape packs. Preferably, the yoke is configured such that a straight line from a point of yoke articulation (generally referred to as the pivot point) to a rotation axis of a hub of the smallest tape pack (referred to herein as the take-up pack) makes an acute angle with a line from the pivot point to a point of contact between the belt, the take-up pack, and the tension control roller.

In one embodiment, the yoke mechanism is unattached to the cartridge housing, and is retained by the tension in the cartridge belt. In another embodiment, the yoke articulates about a pivot which may be rigidly mounted to the cartridge housing.

In the present invention, the cartridge belt wraps around a conventional drive roller, engages the larger tape pack (referred to herein as the supply pack) and wraps around its adjacent tension control roller constrained in the yoke, wraps around the second tension control roller adjacent the take-up pack, unwraps from the second tension control roller at the point of engagement with the take-up pack, engages the take-up pack, and returns to the drive roller. As the drive roller is driven by the tape drive, the belt provides a biasing force which urges the tension control roller into firm contact with the take-up pack. The articulation of the yoke mechanism maintains contact between the tension control roller and the take-up pack as the packs vary in size.

To improve minimum tape tension, the belt-tape contact must be maintained to efficiently transfer enhanced belt surface speed from the belt to the tape at the point where the belt first contacts the tape pack. To reduce bow tie, it is particularly important that enhanced belt surface speed be transferred to the tape packs near the beginning (or end) of tape when one of the tape packs is small. As the belt unwraps from the tension control roller adjacent the take-up pack, it is reduced in cross-sectional area, and its surface speed increases. This effect is particularly pronounced if the tension control rollers have a smaller diameter than conventional corner rollers. The yoke configuration and its location in the abovedescribed region between the tape packs ensures that the tension control roller adjacent the take-up pack is pulled by the tension in the belt and wedged firmly into engagement with the take-up pack, so that more of the enhanced belt surface speed is transferred directly to the tape at the point of its initial contact with the belt.

The yoke mechanism of the present invention improves contact between the belt and the tape packs as the packs vary in size, which minimizes variations in tape tension. The adhesion of the belt under the tension control roller adjacent the take-up pack is particularly improved near the beginning (or end, depending on the tape direction) of tape, a point at which tape tension in conventional cartridges is undesirably low.

Compared to conventional designs with corner rollers, the yoked tension control rollers of the present invention produce less change in tape tension over the length of the tape, and the tape tension produced is largely independent of speed. The yoked roller arrangement reduces bow tie by increasing tape tension near BOT and EOT, and reduces average tape tension. The reduction in tape tension bow tie lessens tape and head wear and reduces drive force compared to tape cartridges with conventional corner roller arrangements. The yoked roller design improves belt wrap and enhances tape transfer from pack to pack with no increase in roller drag.

DETAILED DESCRIPTION OF THE PREFERRED EMBODIMENTS

Figure 1:
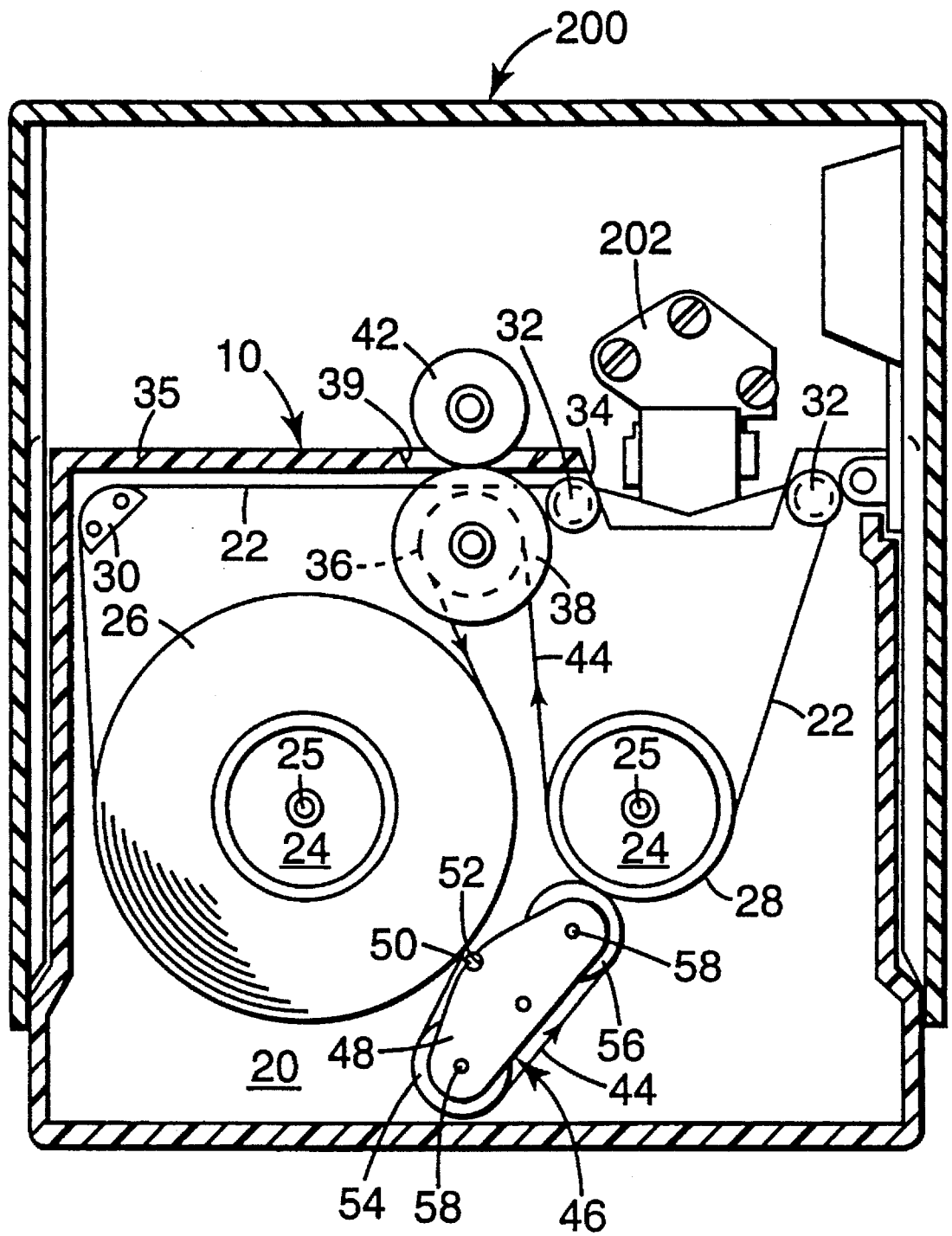
FIG. 1 is a plan view of a drive and cartridge with a two roller yoke according to the present invention.

FIG. 1 illustrates a first embodiment of a drive and cartridge 10 according to the invention. The recording tape 22 is wrapped in opposite directions around hubs 4 which are rotatably mounted on a cartridge housing base 20. Each hub 24 rotates on a bearing mounted shaft 25 which is rigidly affixed generally normal to base 20 to permit hub rotation. The wrapped tape forms a pair of tape packs 26 and 28 which, depending on the direction of tape motion, will function as a supply pack and a take-up pack, respectively. The tape 22 is guided by a corner guide 30 and guide pins 32 past a read/write opening 34 in a front wall 35 of the cartridge. The front wall 35 is substantially perpendicular to the cartridge housing base 20. The placement of the corner guide and guide pins may vary widely depending on the cartridge design and its intended application. For example, to reduce drive force, the corner guide 30 in FIG. 1 is a "flying guide," in which the tape is confined to travel around a smooth, large radius curved surface (see, for example, copending U.S. application Ser. No. 08/086,322). As shown in FIG. 1, a line projected through the axes of rotation of the hubs 24 will be substantially parallel to the front wall 35, although such an alignment of the hubs 24 is not required.

Figure 2:
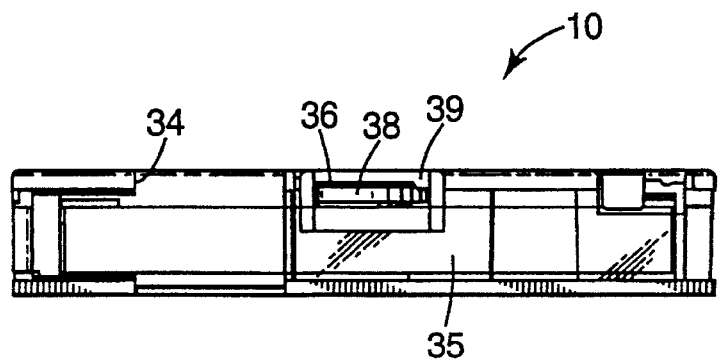
FIG. 2 is a front view of the cartridge of FIG. 1.

Drive surfaces 36 are part of or are mounted to a drive roller 38. As best seen in FIG. 2, access opening 39 is formed in the front wall 35 of the cartridge shell adjacent the drive surface 36 of the drive roller 38 to allow access to the drive roller from the outside of the cartridge by a drive puck 42 (see also FIG. 1).

An elastic belt 44 wraps around the drive surface 36 of drive roller 38, contacts the supply pack 26, wraps around a yoke mechanism 46, contacts the take-up pack 28, and returns to the drive roller. The yoke mechanism 46 includes a yoke 48 located in a region generally between the tape packs. The yoke 48 retains a pair of small rollers, one adjacent each tape pack. The shape and design of the yoke 48 may vary widely depending on the intended application, but in general the yoke includes parallel plates 48a,48a' which lie above and below the tension control rollers, respectively, (see, for example, FIG. 3 A), and appropriate spacers or support means (not shown) to maintain the plates in a parallel relationship. The yoke 48 may be unattached to the housing 20 and maintained in contact with the tape packs by belt tension alone (see, for example, FIG. 3 below). However, to enhance stability of the yoke mechanism, yoke 48 preferably articulates about a pivot, such as, for example, a pin or a post, which is rigidly mounted substantially perpendicular to the cartridge housing 20.

In FIG. 1, the yoke 48 accepts and engages a pivot pin 50 in a medial depression 52. The configuration of the depression 52 may be varied depending on yoke size and the contact force to be maintained between the belt and the tape packs. Generally, the yoke 48 is made sufficiently long and the pivot pin 50 is located in the region between the tape packs such that a first tension control roller 54 is positioned adjacent the supply pack 26 and a second tension control roller 56 is positioned adjacent the take-up pack 28. The tension control rollers 54,56 rotate on shafts 58 constrained the yoke 48. The axes of rotation of the tension control rollers 54,56 are generally parallel to the axes of rotation of the tape hubs 24.

Figure 3:
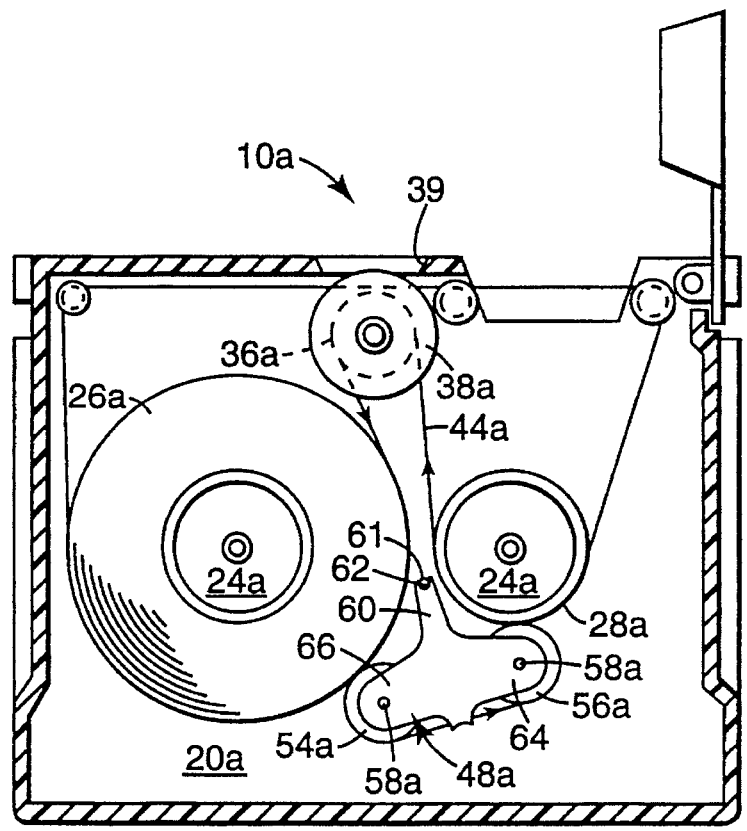
FIG. 3 is a plan view of a cartridge according to the invention in which the yoke has a generally triangular shape.
Figure 3A:
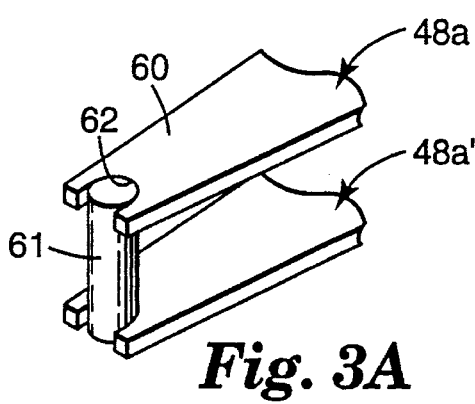
FIG. 3A is a detail of the limit pin and the yoke of the cartridge in FIG. 3.

In an alternate embodiment shown in FIG. 3, the yoke 48a has a generally triangular shape with a first arm 60 extending into the region between the tape packs and including a slot or notch 62 containing a limit pin 61 which is not attached to the cartridge housing (see also FIG. 3A). A second arm 64 of yoke 48a includes shaft 58a for mounting tension control roller 54a adjacent supply pack 26. A third arm 66 of yoke 48a includes a similar shaft 58a for mounting tension control roller 56a adjacent the take-up pack 28a. The limit pin 61 may contact the belt segment wrapping a tape pack to maintain the yoke 48a in a position to effectively control tape tension variation as the tape packs vary in size.

Figure 4A:
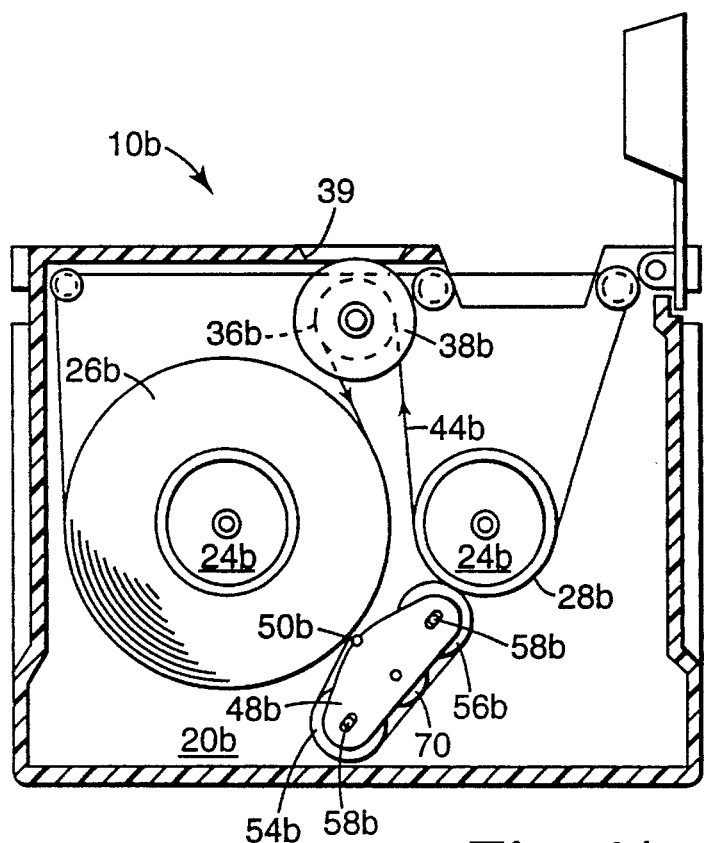
FIG. 4A is a plan view of a cartridge of the invention in which the yoke has three tension control rollers, and the tape in the cartridge is at the beginning of tape (BOT)

In another embodiment illustrated in FIG. 4A, the yoke 48b includes a central tension control roller 70 mounted for rotation between the "outboard" tension control rollers 54b, 56b. If desired, the axis of rotation of the central tension control roller 70 may be in line with the axes of rotation of outboard tension control rollers 54b,56b, but this is not necessary (see, for example, the central tension control roller in the embodiment of the invention illustrated in FIG. 5). The center roller 70 remains in rolling contact with both outboard tension control rollers 54b,56b and reduces the side loads exerted on the shafts 58b. To reduce drive force, the central tension control roller 70 may be mounted in a ball bearing (not shown). In the cartridge shown in FIG. 4A, the yoke dimensions and placement of a pivot post 50b, which is affixed to the cartridge housing, provide a very strong wedging multiplier for the outboard tension control roller 56b when take-up pack 28b is small. The tension control roller 56b is wedged into firm contact with the take-up pack 28b, like a nip roller, to increase tape tension at BOT or EOT, and reduce tape tension bow tie.

Figure 4B:
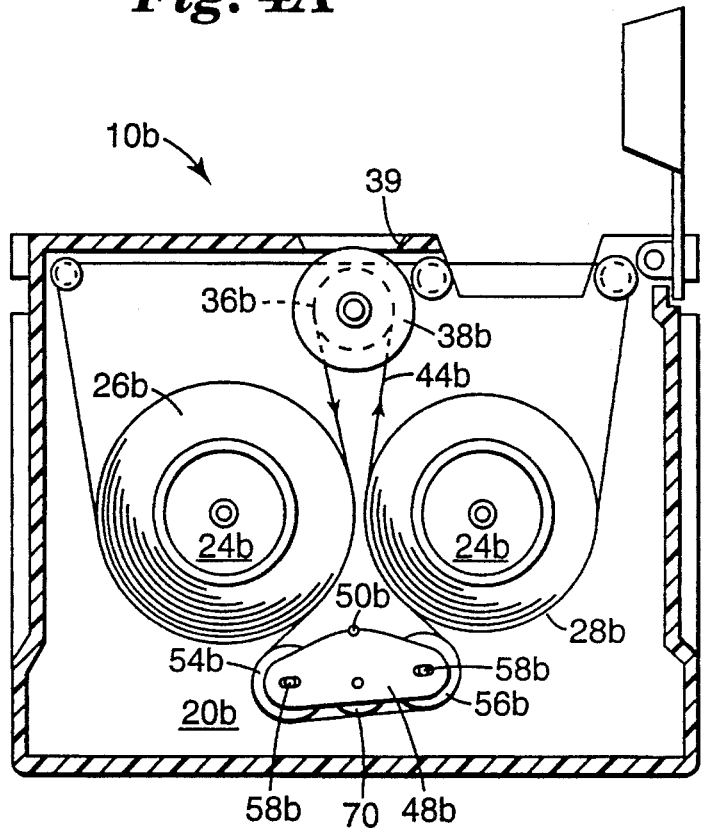
FIG. 4B is a plan view of the cartridge of FIG. 4A in which the tape is at the middle of tape (MOT)

As the tape packs become similar in size near the middle of tape (MOT), the yoke may toggle to the position shown in FIG. 4B, and one or both outboard rollers 54b,56b may disengage the tape packs to reduce drive force and reduce roller impressions formed in the tape during storage.

Figure 5:
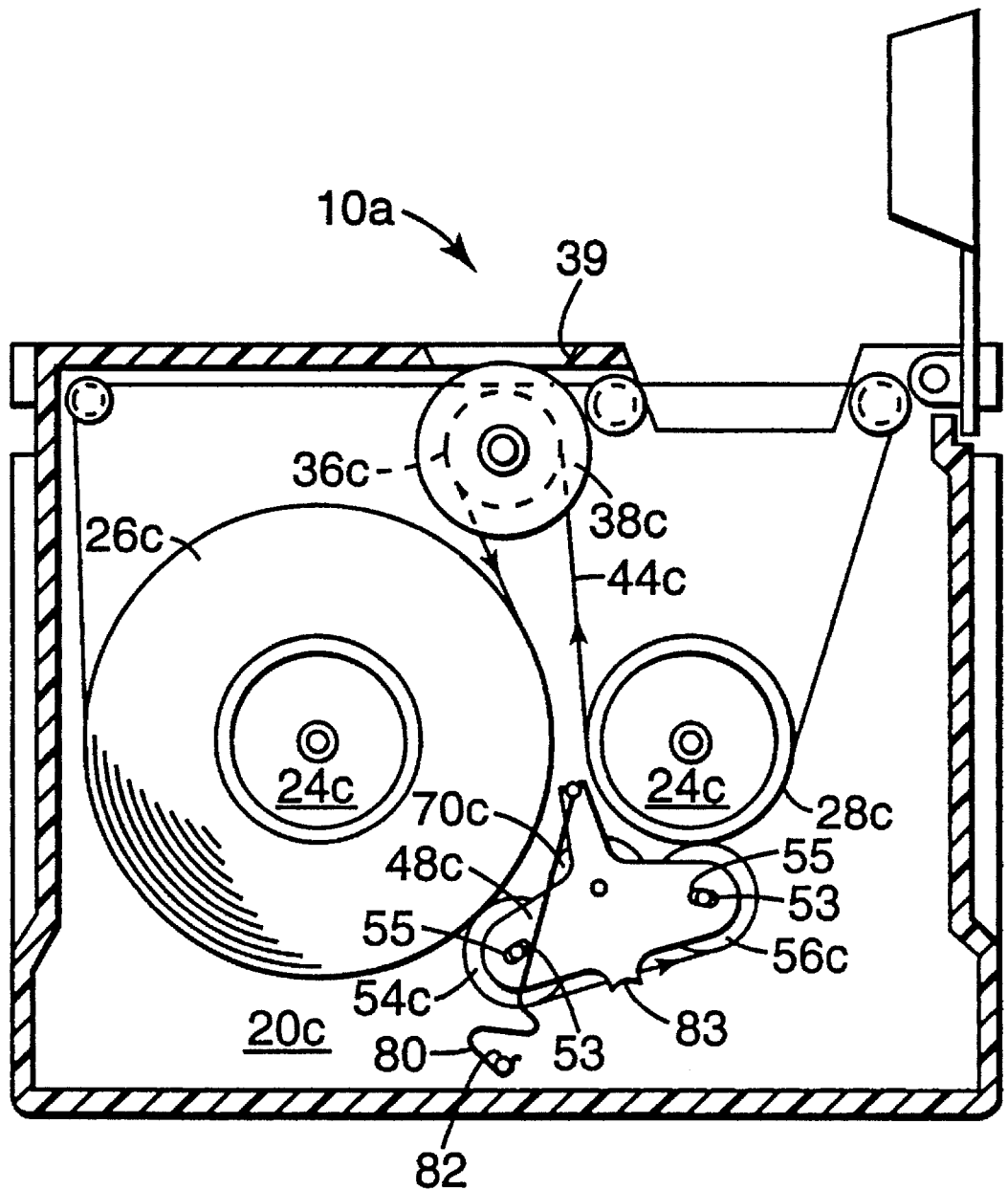
FIG. 5 is a plan view of a cartridge of the invention in which the yoke mechanism includes a supplemental biasing device.

The embodiment shown in FIG. 5 includes a three-cornered yoke 48c with outboard tension control rollers 54c,56c and center tension control roller 70c. The outboard tension control rollers 54c,56c operate on shafts 53 constrained in slots 55 to reduce side loads at their bores. The axis of rotation of center tension control roller 70c is not in line with the axes of rotation of the outboard tension control rollers 54c, 58c. In this arrangement, the central tension control roller 70c lies more directly opposite the resultant belt force, which is the sum from the two strands at each outboard roller, and reduces the side loads at the slots 55 restraining their respective shafts 53.

In the embodiment of the invention shown in FIG. 5, a supplemental biasing mechanism, in this case a spring 80 mounted to the yoke 48c and a pin 82 affixed to the cartridge housing, may be used to enhance contact force between the outboard tension control rollers 54c,56c and the tape packs. When the tape packs are an appropriate size, the notch 83 in yoke 48c may rest on pin 82 to maintain the position of the yoke during manufacture. A portion of the spring 80 may contact the belt wrapping the tape packs, serving like a limit pin, to maintain an effective yoke position.

Figure 6:
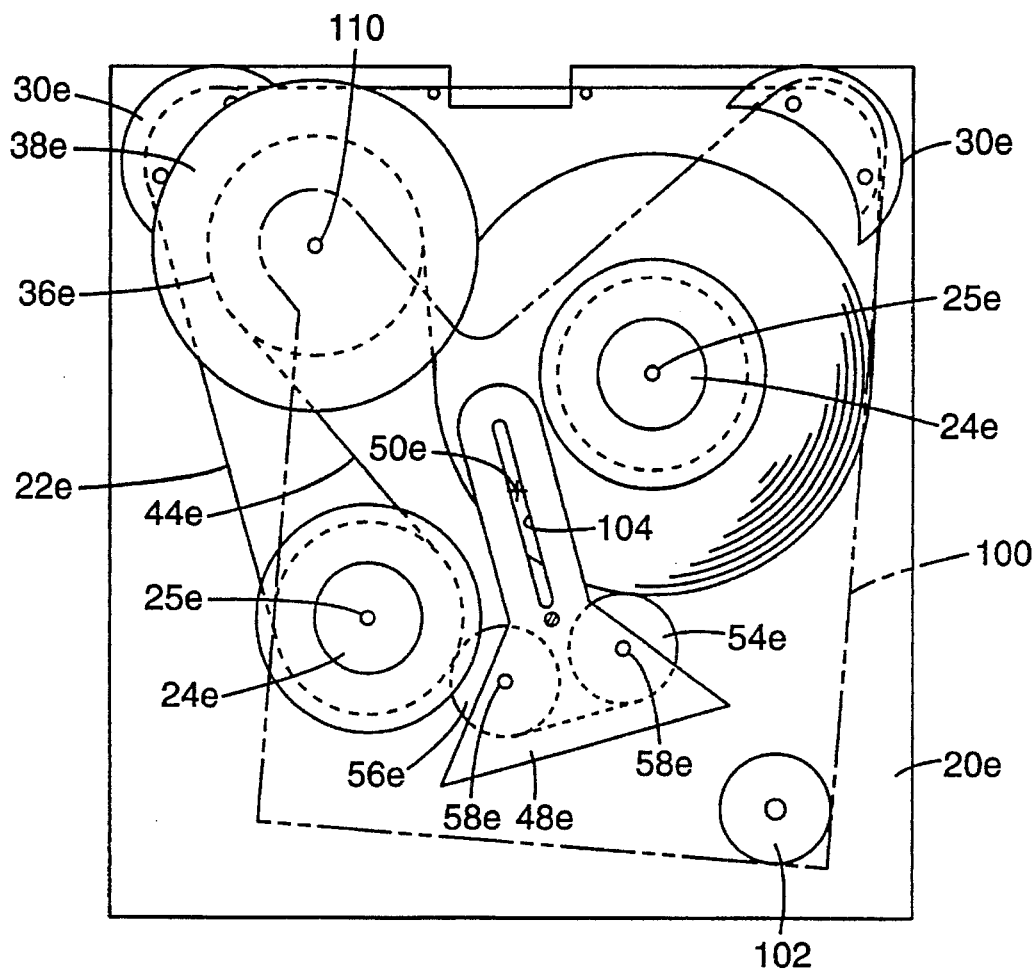
FIG. 6 is a plan view of a cartridge of the invention in which the yoke mechanism includes a supplemental support structure.

The cartridge shown in FIG. 6 features "watchplate construction," and includes a support structure 100 to maintain the axes of the tension control rollers in the yoke 48e parallel to the axes 25e of the hubs 24e. In FIG. 6, the support 100 is mounted on a post 102 and the tape guide 30e, but the support 100 may be attached to the cartridge housing 20e in a variety of ways, and a cantilevered support structure (not shown) may also be used. The support 100 occupies a plane above the yoke 48e and parallel to the plane of the cartridge housing 20e. Pivot pin 0e is mounted to support 100, and is constrained to move in an elongated slot 104 in yoke 48e. Shafts 25e, on which hubs 24e rotate, and shaft 110 of drive roller 38e extend upward and engage structure 100 at appropriately placed openings to limit side-to-side motion of the support structure 100 in a plane parallel to the plane of the cartridge housing 20e. The watchplate construction with support 100 maintains alignment of the hub shafts and drive roller shafts with the yoked tension control rollers to limit vertical movement of the belt-tape interface and enhance belt tracking.

As will be apparent from the above discussion, the location and shape of the yoke mechanism may be varied depending on the desired tape performance characteristics. The pivot location, tension control roller diameter, and distance between the tension control rollers in the yoke can be selected and optimized to produce excellent tape tension control, good pack wrap, and reduced drive force. For example, the slot in the yoke may be sufficiently long to give the yoke considerable freedom to articulate about the pivot, so the tension control rollers and the tape packs remain in contact at all times from BOT to EOT. Or, the slot may be made narrow and shallow to resemble a notch, so the yoke toggles about the pivot and a tension control roller is engaged only with the smallest tape pack (e.g., near BOT or EOT, depending on tape direction) to reduce drive force and lessen variations in tape tension. At MOT, both rollers will then disengage, reducing their impressions on the tape pack during storage.

Any geometry for the yoke is acceptable for use in the present invention, as long as the portion of the belt engaging the tape is brought immediately into firm contact with the tape when it touches the tape packs, particularly the smaller take-up pack. In the present invention, toggle, belt tension, pivot location and yoke shape act together to maintain firm engagement of both the tension control rollers and the tape packs, although supplemental mechanical biasing means may be used if necessary.

In the cartridge of the invention, as the belt unwraps from the small radius tension control roller, it builds a surface velocity in excess of its center thickness (neutral axis) velocity. Since the tension control roller is firmly wedged against the take-up pack by the tension in the belt and the location of the pivot, this excess velocity is transferred more directly and immediately to the tape pack. The belt may also bulge as it contacts the tape pack, further exceeding neutral axis velocity and aiding rapid transfer of this increased velocity to the tape pack.

In the present invention, the belt does not wrap completely around the tape packs, and the arcuate belt segment contacting the packs may be quite short compared to conventional designs. However, the degree of contact between the belt and the tape is not critical so long as the belt drives the tape packs reliably without slippage. The firm engagement of the outboard tension control rollers with the tape packs, which is provided by the tension in the belt itself, and the toggle geometry produce excellent pack wrap and reduce tape tension variation compared to tape cartridges with conventional corner rollers. Both outboard tension control rollers contribute to the performance of the invention, although the firm engagement of the tension control roller with the smaller take-up pack appears to be the most important in reducing variations in tape tension.

The cartridge of the invention may be placed in any conventional tape drive so information may be read or written to the tape in the manner well known in the art. As shown in FIG. 1, a typical drive 200 according to the invention includes a read/write head 202, and a drive motor (not shown) with a suitable drive gear or puck 42. The drive 200 includes all of the many other items necessary for its function, for example, a loading mechanism, circuitry to interpret magnetic signals detected by the head from the tape and to write to the tape, circuitry to position the o head relative to the tape, and the like. Such drive elements are well known to one of ordinary skill in the art and therefore will not be further described here.

If a tape cartridge according to the present invention is placed in drive 200 as shown in FIG. 1, the read/write head 202 is positioned adjacent the read/write opening 34, where it has access to the tape 22. Drive puck 42 is positioned against the drive roller 36. To advance the tape in either direction, the drive motor drives the drive puck 42, which in turn drives the drive roller 36. Frictional engagement between the drive roller 36 and the continuous belt 44 causes the belt to move in the driven direction. The tension in the belt 44 pulls the tension control rollers 54,56 in the yoke 48 into engagement with the tape packs 26,28, respectively. As the belt 44 moves, it contacts a first tape pack over a given arcuate segment, traverses an interface between the first tape pack and the first tension control roller adjacent that pack, wraps around the first tension control roller and the second tension control roller in the yoke, and traverses an interface between the second tape pack and the second tension control roller adjacent that pack, contacts the second tape pack over a given arcuate segment, and returns to the drive roller. The contact between the belt and the tape packs moves the tape.

Belt tension in the cartridge of the invention biases the yoke mechanism and preserves the firm engagement of the tension control rollers with the tape packs. The drive belt of the invention may be made of any suitable elastomeric material, and is preferably an endless belt. The belt tension may vary widely, but should be sufficient to maintain firm contact between the tension control rollers and their respective tape packs.

Figure 7:
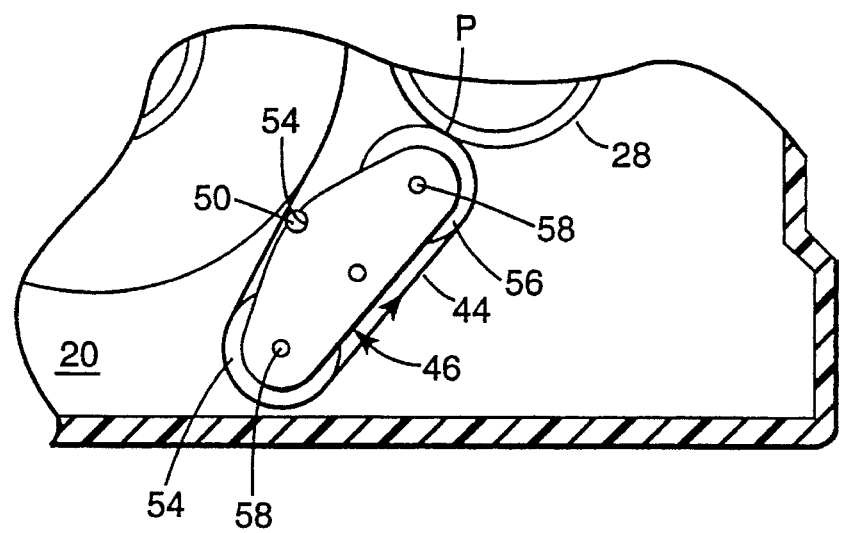
FIG. 7 is a detail of the interfaces between the tension control rollers and the tape packs.

As noted above and shown in FIG. 7, the tension control roller 56, tape pack 28, and the belt 44 contact one another at point of engagement P. If belt 44 is made of a material which bulges as it engages tape pack, the effective radii of the roller and belt increase, which increases the belt's tangential speed at P. With stretchable reinforced belt materials, this high tangential speed can be maintained while the belt traverses the nip at P. Further, the high roller contact force reduces the preferred belt's cross-sectional thickness while minimally affecting its width, thus increasing length per second of belt traversing the nip region. o In the preferred embodiments, the tape is a magnetic recording tape. However, within the scope of the present invention, the term "tape" includes microfilm, paper webs or any other elongated flexible web material which may be transported between a pair of reels.

The present invention will be further described with reference to the following examples.

EXAMPLES

Example 1

Figure 8A:
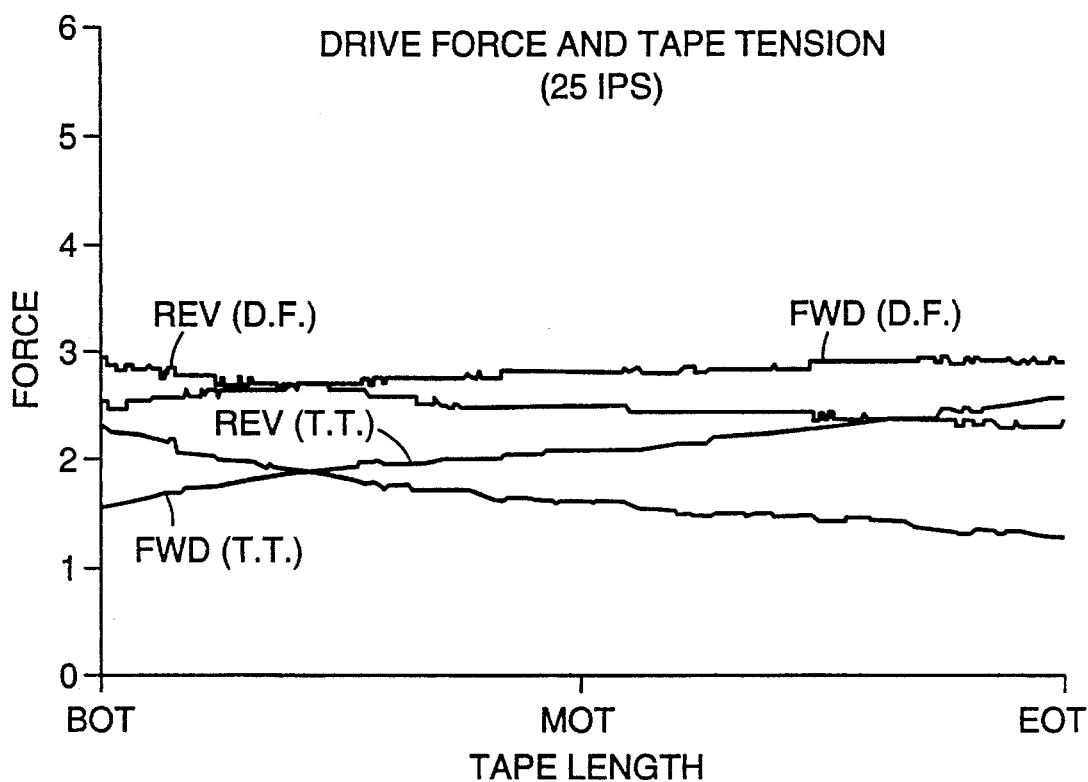
FIG. 8A is a drive force and tape tension plot at a tape speed of 25 ips for a data cartridge with conventional corner rollers.

In this example, the cartridge of the present invention with yoked tension control rollers was compared to an otherwise identical data cartridge with conventional corner rollers. The tape tension plot for the cartridge with corner rollers, FIG. 8A, shows tape tension (T.T.) and drive force (D.F.) at a tape speed of 25 inches per second (ips). FIG. 8A shows a variation in tape tension from BOT to EOT in both the forward and reverse directions, known in the art as tape tension bow tie. A variation in drive force is also present in the cartridge with conventional corner rollers.

Figure 8B:
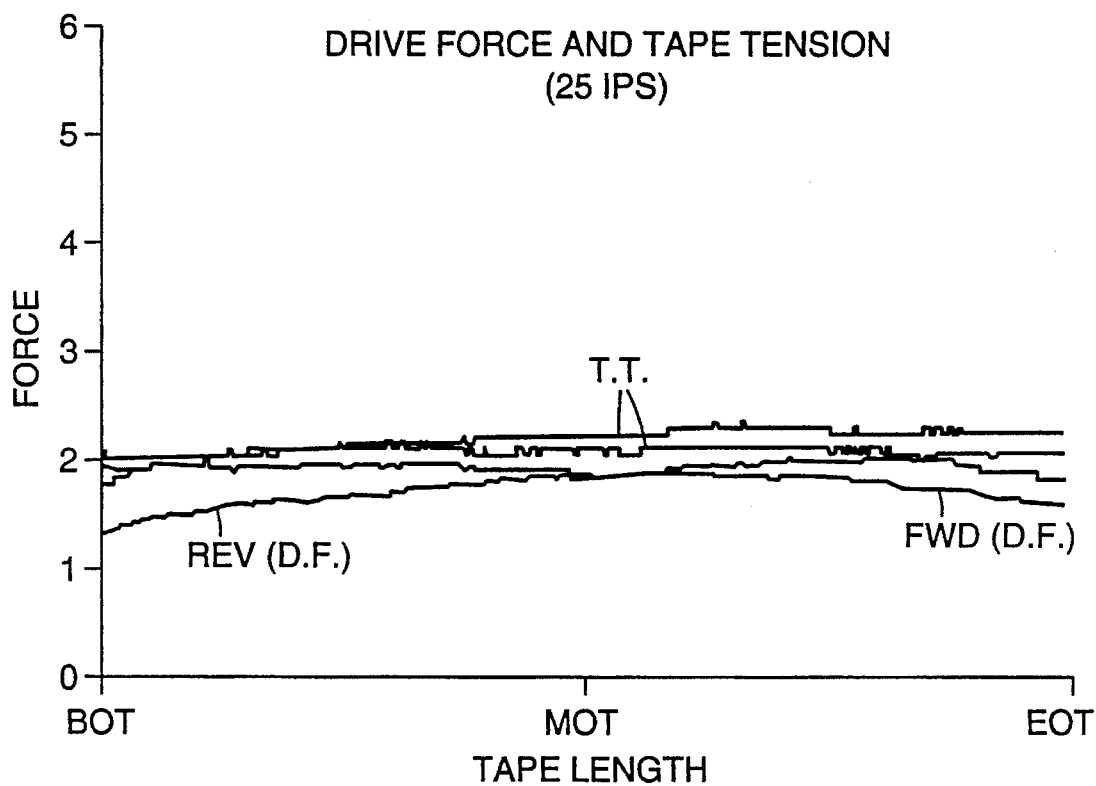
FIG. 8B is a drive force and tape tension plot at a tape speed of 25 ips for the cartridge of FIG. 6.

The tape tension and drive force plot at 25 ips of the cartridge shown in Fig. 6 is illustrated in FIG. 8B. The tape tension bow tie and maximum drive force are reduced, compared to the design with corner rollers discussed in FIG. 8A.

Figure 8C:
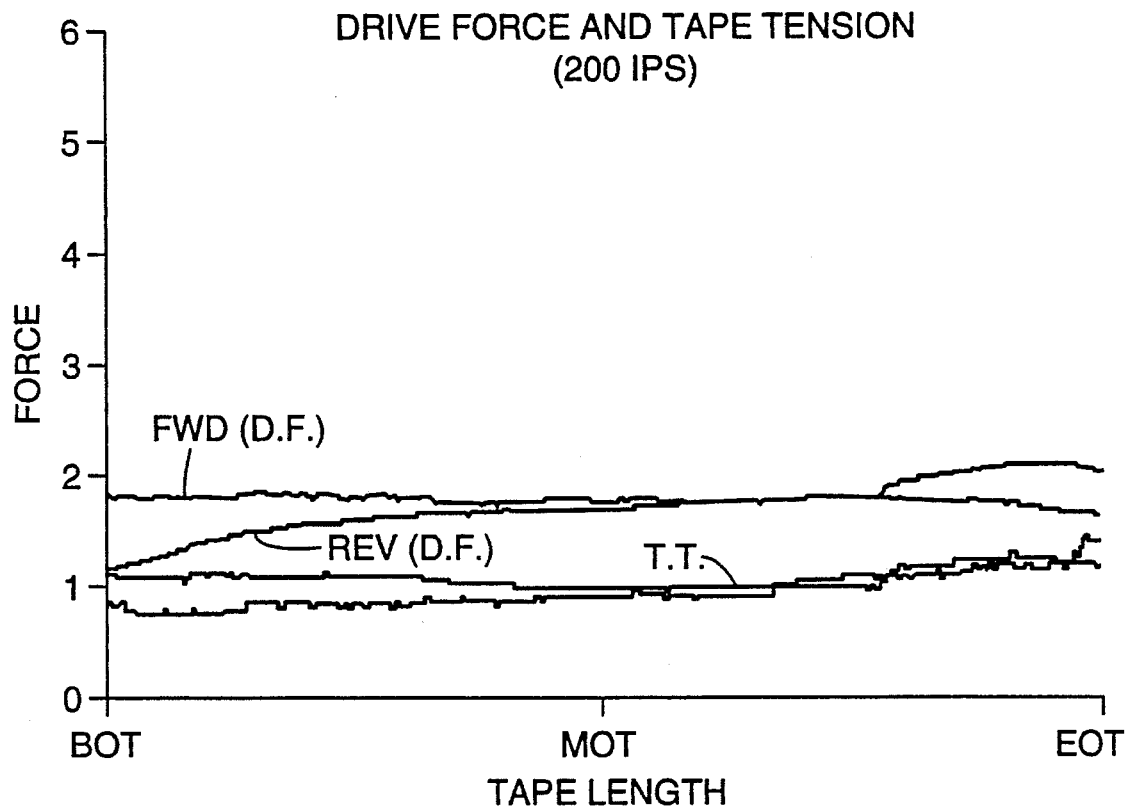
FIG. 8C is a drive force and tape tension plot at a tape speed of 200 ips for the cartridge of FIG. 6.

FIG. 8C is a tape tension and drive force plot at 200 ips of the cartridge of FIG. 6. While a tape tension bow tie appears at this higher tape speed, the bow tie effect is still reduced compared to the cartridge with corner rollers illustrated in Fig. 8A.

Example 2

Figure 9:
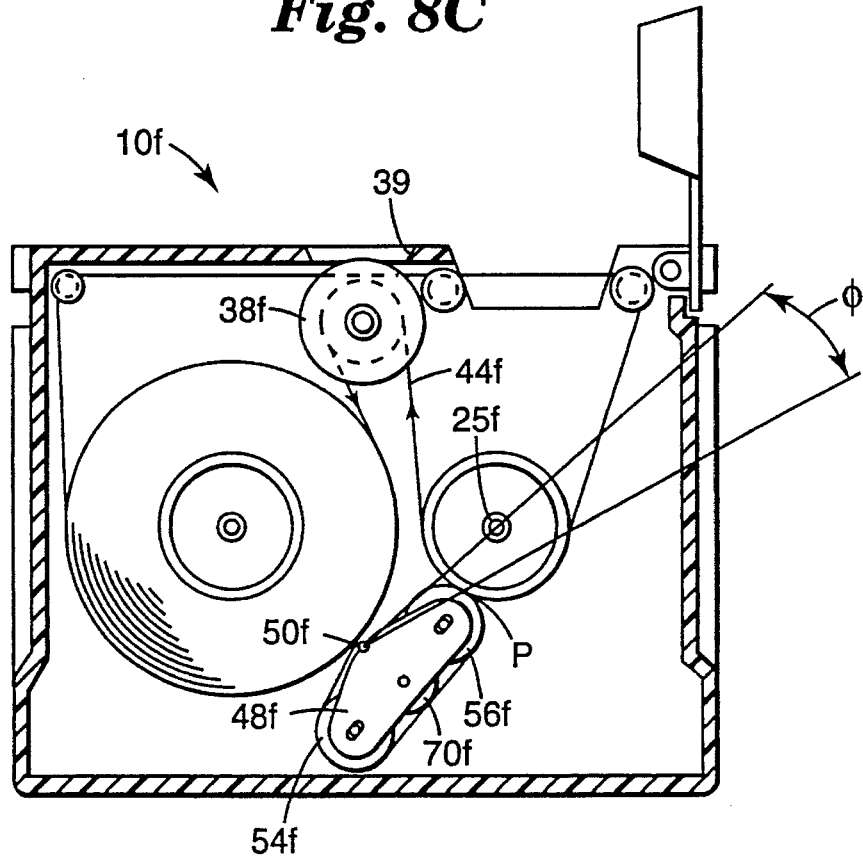
FIG. 9 is a plan view of a cartridge of the present invention.

In this example, a cartridge as shown in FIG. 9 (see also FIG. 4) was fabricated. The pivot post 50*f* was positioned between the tape packs and below the rotation axes of the tape packs, directly below the axis of rotation of the drive roller 38*f*. Two outboard tension control rollers 54*f*,56*f* inch were mounted in a yoke 48*f* with their rotation axes a distance apart equal to the minimum tape pack o diameter. A center tension control roller 70*f* with a diameter smaller than the diameter of the outboard tension control rollers was mounted in the yoke 48*f*. The rotation axis of the central roller 70*f* was in line with the rotational axes of the outboard rollers. At BOT, the point of engagement P (see also FIG. 7) was at an angle $\phi$ away from a line between the hub shaft 25*f* and the pivot pin 50*f*.

The roller dimensions and pivot post placement in this example provide an angle $\phi$=about 15°. This angle produces a strong wedging multiplier at BOT, equal to $1/\tan \phi$, of approximately four times (4X×) normal force to resist the belt strand pulling to the drive roller. The outboard tension control roller applies this 4X×, plus another 1X× from the other belt strand entering the roller, to the center tension control roller. The center journal bearing feels this 5X× minus the 2X× from the opposite outboard roller for a net of approximately 3X× belt tension as side load on the bearing pin of the central tension control roller.

As noted above, the dimensions of the rollers, hubs and pivot post placement may be modified as the application demands. For example, a slight minimum hub diameter increase can easily modify the nip angle and thus the side load on the center bearing pin. For example, if $\phi$=27°, the side load on the center bearing pin drops to only 2X× normal force. In general, $\phi$ will be an acute angle, and preferably will range between about 15 and about 30 degrees.

Example 3

Figure 10:
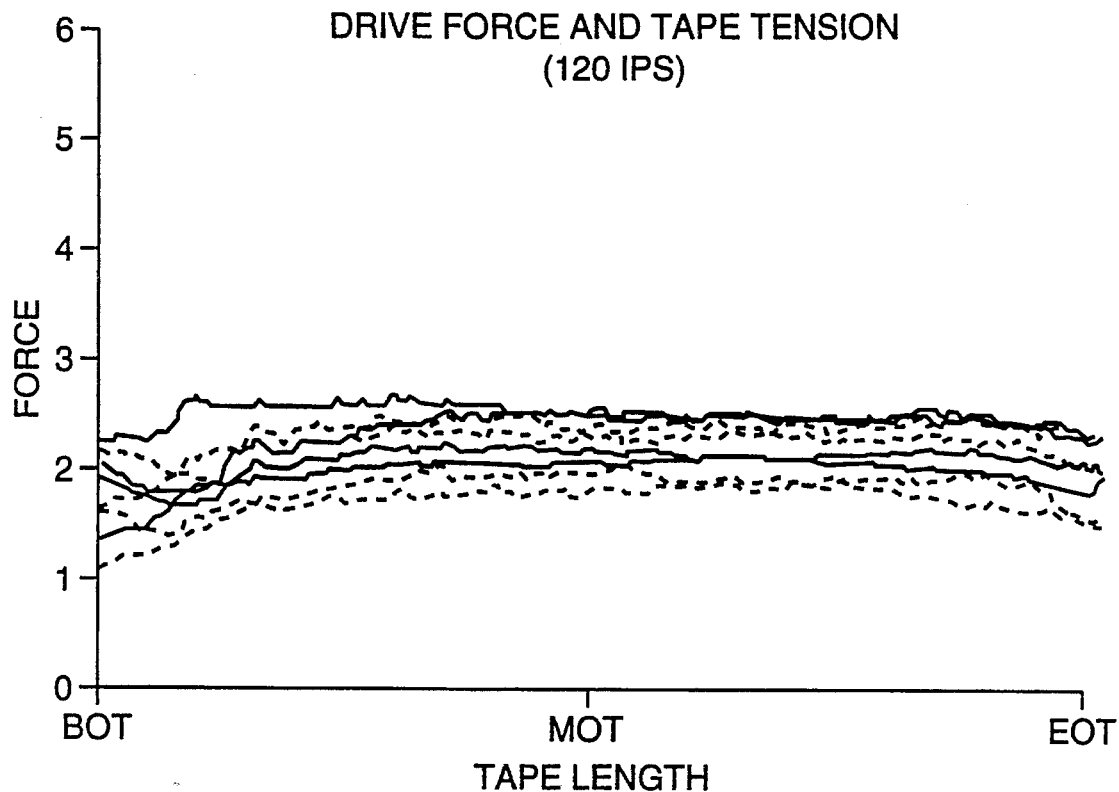
FIG. 10 is a drive force and tape tension plot at a tape speed of 120 ips for o the cartridge of FIG. 4 with a slotted yoke, two tension control rollers, and a friction reducing tape guide.

A cartridge was fabricated with a design identical to that of Example 2, except that: (1) the yoke included an elongated slot, not a notch; and (2) the yoke did not include a central tension control roller; and (3) the tape traveled in large radius, friction-reducing guides. A tape tension plot for this design is shown in Fig. 10. The broken lines in FIG. 10 (and FIG. 11 below) represent the limits of instantaneous tension variation about the average represented by the solid lines.

The slotted yoke, which was free to slide on the pivot post, kept the tension control rollers in full contact with the tape packs from BOT to EOT. The tape tension plot shows a relatively constant tape tension from BOT to EOT, with the highest tape tension near MOT. Compared to the cartridge in Example 2, the drive force is reduced with the large radius guides.

Example 4

Figure 11:
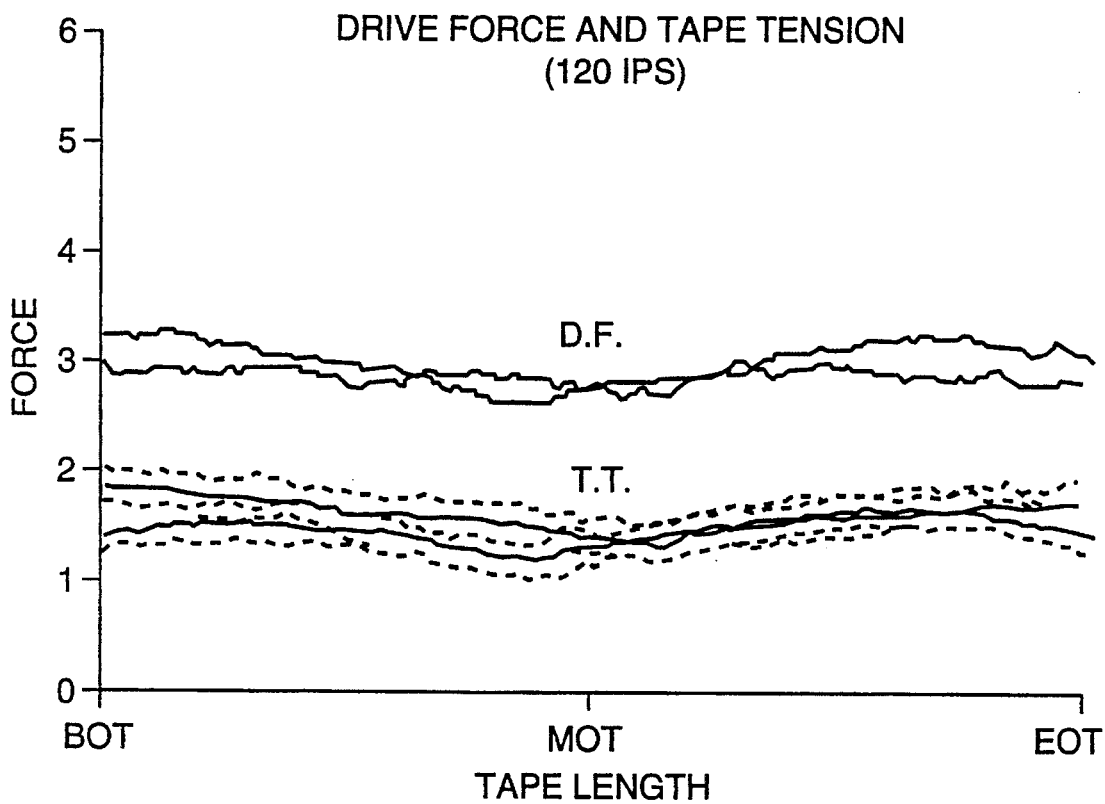
FIG. 11 is a drive force and tape tension plot at a tape speed of 120 ips for the cartridge of FIG. 4 with a notched yoke, two tension control rollers, and standard tape guides.

In this example, a cartridge was fabricated with the design shown in FIG. 1, using a notched yoke with two tension control rollers. A tape tension plot for this design is shown in FIG. 11.

The notched yoke allows the yoke to toggle to the smallest tape pack, particularly at BOT and EOT. When the tape packs are of equal size near MOT, the dip in the plot shows that neither roller is firmly in contact with the tape packs. This design would reduce tape impressions when the cartridge is stored at MOT.

It will be understood that the exemplary embodiments described herein in no way limit the scope of the invention. Other modifications of the invention will be apparent to those skilled in the art in view of the foregoing description. These descriptions are intended to provide specific examples of embodiments which clearly disclose the present invention. Accordingly, the invention is not limited to the described embodiments or to the use of the specific elements, dimensions, materials or configurations contained therein. All alternative modifications and variations which fall within the spirit and scope of the appended claims are included in the present invention.

We claim:

1. A tape cartridge comprising:

first and second hubs mounted for rotation on a housing, wherein tape is wound in opposite directions around the hubs to form two tape packs;

a drive roller rotatably mounted on the housing;

first and second tension control rollers, one mounted adjacent each tape pack for rotation on a shaft constrained in a yoke, a third roller mounted for rotation between said first and second tension control rollers on a third shaft constrained in the yoke, wherein the third roller contacts the first and second tension control rollers, and wherein said yoke articulates about a pivot located in a region between the drive roller and a line projected through the shafts of said tension control rollers and parallel to a plane of said cartridge housing; and an elastic belt stretched around the drive roller and the tension control rollers and engaging the tape packs.

2. A tape cartridge comprising:

first and second hubs mounted for rotation on a housing, wherein tape is wound in opposite directions around the hubs to form a take-up tape pack and a supply tape pack;

a drive roller rotatably mounted on the housing;

a first tension control roller and a second tension control roller mounted for rotation on a first shaft and a second shaft, wherein said shafts are constrained in a yoke such that the first tension control roller is adjacent the take-up tape pack and the second tension control roller is adjacent the supply pack, and wherein the yoke articulates about a pivot pin affixed to said housing and generally perpendicular thereto, and said pivot pin is located in a region between the drive roller and a line projected through the shafts of said first and second tension control rollers and parallel to a plane of said cartridge housing; and an elastic belt stretched around the drive roller and the rollers in said yoke and engaging the supply tape pack and the take-up tape pack.

3. A tape cartridge as claimed in claim 2, wherein a third roller is mounted for rotation in said yoke between said first and second tension control rollers, and wherein said third roller remains in contact with the first and second tension control rollers.

4. A tape cartridge as claimed in claim 2, wherein a third, roller is mounted for rotation in said yoke between said first and second tension control rollers, and wherein said third roller remains in contact with the first and second tension control rollers.

5. A tape cartridge as claimed in claim 2, wherein said first and second shafts are constrained in elongated slots in said yoke.

6. A tape cartridge as claimed in claim 2, wherein said first and second shafts are constrained in elongated slots in said yoke.

7. A tape cartridge as claimed in claim 2, wherein the yoke has a generally elongated shape with a medial depression to engage the pivot pin, and wherein the tension control rollers are mounted along a longitudinal axis of the yoke.

8. A tape cartridge as claimed in claim 7, wherein the depression is a slot sufficiently long to maintain constant contact of the tension control rollers with the tape packs.

9. A tape cartridge as claimed in claim 7, wherein the depression is a notch sufficiently long to permit the yoke to toggle between the tape packs.

10. A tape cartridge as claimed in claim 2, wherein said yoke comprises three elongate arms, a first arm extending between said tape packs and including a limit pin to maintain the yoke in said region, a second arm mounting said first tension control roller, and a third arm mounting said second tension control roller.

11. A tape cartridge as claimed in claim 10, wherein said yoke further comprises a third roller mounted for rotation on a third shaft in the yoke, wherein said third roller is positioned between and in contact with the first and second tension control rollers.

12. A tape cartridge as claimed in claim 11, wherein the third shaft is in line with the first and second shafts.

13. A tape cartridge as claimed in claim 17, wherein the third shaft rotates in a ball bearing in said yoke.

14. A tape cartridge as claimed in claim 2, wherein the take-up pack and the supply pack rotate on respective first and second hub shafts which are substantially perpendicular to said housing, and wherein the shafts of said tension control rollers are substantially parallel to the shafts of said hubs.

15. A tape cartridge as claimed in claim 14, wherein a line projected from the pivot to the first hub shaft makes an acute angle with a line from said pivot to a point of contact where the belt engages the take-up pack.

16. A tape cartridge as claimed in claim 2, further comprising biasing means to urge the tension control rollers into engagement with the tape packs.

17. A tape cartridge as claimed in claim 16, wherein said biasing means is a spring attached to said yoke and engaging a pin attached to said housing.

18. A tape cartridge comprising:

a housing with a media access opening and drive access opening formed therein;

first and second hubs mounted for rotation on first and second hub shafts attached to said housing;

tape wound in opposite directions around the hubs to form a supply pack and a take-up pack;

at least one tape positioning element for guiding the tape past the media access opening;

a drive roller rotatably mounted inside the housing and accessible from the outside of the housing through the drive access opening;

a support mounted to said housing and occupying a second plane above the tape packs and parallel to a plane of the housing, wherein said support engages said hub shafts, a yoke mechanism comprising a yoke pivotally mounted to said support and free to articulate between the tape packs and between the plane of said housing and the second plane occupied by the support, wherein said yoke comprises two rollers each mounted for rotation on respective shafts constrained in said yoke, wherein a first roller in said yoke is adjacent the take-up pack and the second roller in said yoke is adjacent the supply pack; and an elastic belt stretched around the drive roller and the rollers in said yoke and engaging the tape packs, so movement of the drive roller will move the belt.

19. A tape cartridge as claimed in claim 18, wherein the yoke articulates about a pivot located in a region between the drive roller and above a line projected through the shafts of rollers in the yoke and parallel to a plane of said cartridge housing.

20. A tape cartridge as claimed in claim 19 wherein the supply pack and the take-up pack rotate on respective first and second hub shafts, and wherein a line projected from the pivot to the first hub shaft makes an acute angle with a line from said pivot to a point of contact where the belt engages the take-up pack.

21. A tape cartridge as claimed in claim, 18 wherein the yoke further comprises a third roller mounted for rotation between said first and second rollers, wherein the third roller is of sufficient diameter to remain in contact with first and second tension control rollers.

22. A tape cartridge comprising:

first and second hubs mounted for rotation on spaced parallel shafts affixed to a housing, wherein tape is wound in opposite directions around the hubs to form a supply tape pack and a take-up tape pack;

a drive roller rotatably mounted on the housing;

a yoke mechanism comprising a yoke with first and second tension control rollers mounted for rotation on respective first and second shafts constrained in said yoke, wherein the yoke is of sufficient length to maintain the first tension control roller adjacent the take-up pack and the second tension control roller adjacent the supply pack, the yoke further comprising a depression to engage a pivot pin rigidly mounted to the housing and between the tape packs in a region between the drive roller and above a line projected through the first and second shafts of said tension control rollers and parallel to a plane of said housing; and an elastic belt contacting the tape packs and stretched around the drive roller and the tension control rollers in said yoke, wherein said belt is under sufficient tension to pull the yoke mechanism into engagement with the supply pack and the take-up pack, so movement of the drive roller will move the belt, thereby moving the tension control rollers and the tape, and wherein a straight line from the pivot pin to a shaft of the hub of the take-up pack makes an acute angle with a line from said pivot pin to a point of contact where the belt contacts the take-up pack.

23. A tape cartridge as claimed in claim 22, wherein the acute angle is from about 15° to about 30°.

24. A tape cartridge as claimed in claim 22, wherein the acute angle is sufficient such that the belt engages the take-up pack without slippage.

25. A tape cartridge as claimed in claim 22, wherein the yoke has a generally elongated shape with a medial slot to accept the pivot pin, and wherein the tension control rollers are positioned along the longitudinal axis of the yoke.

* * * * *

UNITED STATES PATENT AND TRADEMARK OFFICE
CERTIFICATE OF CORRECTION

PATENT NO.: 5,573,195
DATED: November 12, 1996
INVENTOR(S): Runyan et al.

It is certified that error appears in the above-identified patent and that said Letters Patent is hereby corrected as shown below:

Col. 1, line 17, "pan-way" should be --part-way--.
Col. 1, line 22, "comer" should be --corner--.
Col. 2, line 17, "din" should be --dirt--.
Col. 4, line 23, "comer" should be --corner--.
Col. 6, line 9, "0e" should be --50e--.
Col. 7, line 14, "the o head" should be --the head--.
Col. 7, line 57, "region. O In" should be --region. In--.
Col. 8, line 28, "pack o diameter" should be --pack diameter--.
Col. 8, line 39, "(4Xx)" should be --(4X)--.
Col. 8, line 41, "4Xx" should be --4X--.
Col. 8, line 41, "1Xx" should be --1X--.
Col. 8, line 43, "5Xx" should be --5X--.
Col. 8, line 44, "2Xx" should be --2X--.
Col. 8, line 45, "3Xx" should be --3X--.
Col. 8, line 53, "2Xx" should be --2X--.

Signed and Sealed this

First Day of July, 1997

Attest:

BRUCE LEHMAN

*Attesting Officer*   *Commissioner of Patents and Trademarks*